(12) United States Patent
Williams et al.

(10) Patent No.: US 8,250,411 B2
(45) Date of Patent: Aug. 21, 2012

(54) DIAGNOSTIC CONTEXT CONSTRUCTION AND COMPARISON

(75) Inventors: Michael John Williams, Ely (GB); Richard Roy Grisenthwaite, Nr Royston (GB); Andrew Brookfield Swaine, Cambridge (GB); John Michael Horley, Cambridge (GB)

(73) Assignee: ARM Limited, Cambridge (GB)

( * ) Notice: Subject to any disclaimer, the term of this patent is extended or adjusted under 35 U.S.C. 154(b) by 497 days.

(21) Appl. No.: 12/318,442

(22) Filed: Dec. 30, 2008

(65) Prior Publication Data

US 2009/0193297 A1   Jul. 30, 2009

(30) Foreign Application Priority Data

Jan. 24, 2008   (GB) .................................. 0801338.5

(51) Int. Cl.
*G06F 11/00* (2006.01)
(52) U.S. Cl. ........................................... 714/45; 714/34
(58) Field of Classification Search ................... 714/35, 714/30, 34, 45
See application file for complete search history.

(56) References Cited

U.S. PATENT DOCUMENTS

| | | | | |
|---|---|---|---|---|
| 5,812,830 | A * | 9/1998 | Naaseh-Shahry et al. .... | 713/400 |
| 6,427,162 | B1 * | 7/2002 | Mohamed ..................... | 718/108 |
| 6,633,838 | B1 | 10/2003 | Arimilli et al. | |
| 6,857,084 | B1 * | 2/2005 | Giles ............................. | 714/35 |
| 6,862,694 | B1 * | 3/2005 | Tormey et al. ................. | 714/34 |
| 7,111,146 | B1 * | 9/2006 | Anvin ........................... | 711/207 |
| 7,200,776 | B2 * | 4/2007 | Harris ............................ | 714/45 |
| 7,332,929 | B1 | 2/2008 | Normoyle et al. | |
| 7,334,161 | B2 * | 2/2008 | Williams et al. .............. | 714/34 |
| 2002/0184477 | A1 * | 12/2002 | Swaine et al. ................ | 712/227 |
| 2002/0188831 | A1 * | 12/2002 | Jackson et al. ............... | 712/227 |
| 2004/0128585 | A1 * | 7/2004 | Hind et al. ..................... | 714/38 |
| 2006/0075310 | A1 | 4/2006 | Tagawa | |
| 2009/0055641 | A1 * | 2/2009 | Smith ............................ | 713/100 |

FOREIGN PATENT DOCUMENTS

| | | |
|---|---|---|
| EP | 0 762 278 | 3/1997 |
| EP | 0 862 115 | 9/1998 |
| EP | 1 429 250 | 6/2004 |
| GB | 2 383 437 | 6/2003 |
| GB | 2 413 657 | 11/2005 |
| GB | 2 443 277 | 4/2008 |
| GB | 2456813 B * | 3/2012 |
| WO | WO 01/71502 | 9/2001 |
| WO | WO 2007/002940 | 1/2007 |

OTHER PUBLICATIONS

UK Search Report for UK 0801338.5 dated May 12, 2008.
UK Search Report for UK 0801338.5 dated Oct. 15, 2008.
UK Examination Report dated Oct. 14, 2011 for GB 0801338.5.

* cited by examiner

*Primary Examiner* — Scott Baderman
*Assistant Examiner* — Elmira Mehrmanesh
(74) *Attorney, Agent, or Firm* — Nixon & Vanderhye P.C.

(57) ABSTRACT

A data processing system 1 has a processor core 2 which is programmable to act as one of a plurality of virtual machines each identified by a virtual machine identifier, each virtual machine acting in one of a plurality of contexts each identified by a context identifier, each context executing a sequence of program instructions, each program instruction having one or more associated memory addresses. The data processing system has diagnostic circuitry 10 for performing diagnostic operations on the processor core. Diagnostic control circuitry 12 is provided which is responsive to current values of the virtual machine identifier, the context identifier and at least one of the one or more associated memory addresses to trigger the diagnostic circuitry 10 to perform diagnostic operations.

38 Claims, 7 Drawing Sheets

| BCV bit: | | | Description | Output: | Inputs: Address Match | Debug Context Match | Linked Result |
|---|---|---|---|---|---|---|---|
| 22 | 21 | 20 | | | | | |
| 0 | 0 | 0 | Unlinked instruction virtual address match | Result | Y | N | N |
| 0 | 0 | 1 | Linked instruction virtual address match | Result | Y | N | Y |
| 0 | 1 | 0 | Unlinked debug context match | Result | N | Y | N |
| 0 | 1 | 1 | Linked debug context match | Link | N | Y | N |
| 1 | 0 | 0 | Unlinked instruction virtual address mismatch | Result | Y (NOT) | N | N |
| 1 | 0 | 1 | Linked instruction virtual address mismatch | Result | Y (NOT) | N | Y |
| 1 | 1 | 0 | Reserved | — | — | — | — |
| 1 | 1 | 1 | Reserved | — | — | — | — |

| BCV bit: 23 | 22 | 21 | 20 | Description | Output: | Inputs: Address Match | Inputs: Debug Context Match | Inputs: VMID Match | Linked Result |
|---|---|---|---|---|---|---|---|---|---|
| 0 | 0 | 0 | 0 | Unlinked instruction virtual address match | Result | Y | N | N | N |
| 0 | 0 | 0 | 1 | Linked instruction virtual address match | Result | Y | N | N | Y |
| 0 | 0 | 1 | 0 | Unlinked debug context match | Result | N | Y | N | N |
| 0 | 0 | 1 | 1 | Linked debug context match | Link | N | Y | N | N |
| 0 | 1 | 0 | 0 | Unlinked instruction virtual address mismatch | Result | Y(NOT) | N | N | N |
| 0 | 1 | 0 | 1 | Linked instruction virtual address mismatch | Result | Y(NOT) | N | N | Y |
| 0 | 1 | 1 | 0/1 | Reserved | — | — | — | — | — |
| 1 | 0 | 0 | 0 | Unlinked VMID match | Result | N | N | Y | N |
| 1 | 0 | 0 | 1 | Linked VMID match | Link | N | N | Y | N |
| 1 | 0 | 1 | 0 | Unlinked debug context + VMID match | Result | N | Y | Y | N |
| 1 | 0 | 1 | 1 | Linked debug context + VMID match | Link | N | Y | Y | N |
| 1 | 1 | 0 | 0 | Reserved | — | — | — | — | — |
| 1 | 1 | 0 | 1 | Reserved | — | — | — | — | — |
| 1 | 1 | 1 | 0 | Reserved | — | — | — | — | — |
| 1 | 1 | 1 | 1 | Reserved | — | — | — | — | — |

| If CSV2 bits... | ...equal to: | then SCV bits... | ...come from: |
|---|---|---|---|
| [31:16] | Reserved | | |
| [15:12] | 0000 | [31:24] | CONTEXTIDR [31:24] |
| | 0001 | | VMIDR [7:0] |
| | 0010 | | DBGUIDR [31:24] |
| | 1111 | | '00000000' |
| | All other values | | Reserved |
| [11:4] | 0000 0000 | [23:8] | CONTEXTIDR [23:8] |
| | 0010 0010 | | DBGUIDR [23:8] |
| | 1111 1111 | | '00000000' |
| | All other values | | Reserved |
| [3:0] | 0000 | [7:0] | CONTEXTIDR [7:0] |
| | 0010 | | DBGUIDR [7:0] |
| | 1111 | | '00000000' |
| | All other values | | Reserved |

FIG. 7

| CSV2 Value | SCV Value [31:24] | SCV Value [23:8] | SCV Value [7:0] | Description |
|---|---|---|---|---|
| 0X0000 | CONTEXTIDR [31:24] | CONTEXTIDR [23:8] | CONTEXTIDR [7:0] | CONTEXTID ONLY |
| 0X2222 | DBGUIDR [31:24] | DBGUIDR [23:8] | DBGUIDR [7:0] | DBGUID ONLY |
| 0X1FFFF | VMIDR [7:0] | 0X0000 | 0X00 | VMID ONLY |
| 0X1220 | VMIDR [7:0] | DBGUIDR [23:8] | CONTEXTIDR [7:0] | VMID + DBGUID + ASID |
| 0XFFF0 | 0X00 | 0X0000 | CONTEXTIDR [7:0] | ASID ONLY |

FIG. 8

DIAGNOSTIC CONTEXT CONSTRUCTION AND COMPARISON

TECHNICAL FIELD

The technology relates to the field of data processing systems, and more particularly, to data processing systems providing diagnostic mechanisms for facilitating the analysis of execution of sequences of program instructions.

BACKGROUND

In a data processing apparatus it is useful to provide mechanisms for performing diagnostic operations which may be used, for example, during the development of the data processing system. One mechanism which may be provided is to arrange a trigger point which causes a diagnostic operation to be performed when a predetermined event is detected. For example, a breakpoint may be set up so that a diagnostic operation is triggered when a program instruction is fetched from a predetermined address in memory. Alternatively, or additionally, a watchpoint may be set up to trigger a diagnostic operation when a program instruction accesses a predetermined address in memory.

In a data processing apparatus, sequences of program instructions which are executed by a processor are typically stored in a memory. In some systems the processor is able to operate in a number of states known as contexts, each context comprising a sequence of program instructions executed in turn. An example of such systems are the processors produced by ARM Limited of Cambridge, in which the context is identified by a context identifier, eight bits of which are used as an application space identifier (ASID) tag to identify one of up to 256 processes. In a system using virtual addressing, the different contexts will share the virtual address space and the ASID provides a way of differentiating between data at the same virtual address within different contexts.

It is known to provide context-aware trigger points, which trigger performing a diagnostic operation in a manner responsive to the context identifier of the current context of the processor. These context-aware trigger points may be linked to the address-aware trigger points described above, so that a diagnostic operation is only triggered if a predetermined address is accessed and a predetermined context matches the current state of the system.

A processor may be programmed to act as a virtual machine so that it replicates the features of itself or of another machine.

SUMMARY

One aspect, of the technology provides an apparatus for processing data, comprising:

processing circuitry configured to perform processing operations and access memory, said processing circuitry being programmable to act as one of a plurality of virtual machines each identified by a virtual machine identifier, each virtual machine acting in one of a plurality of contexts each identified by a context identifier, each context executing a sequence of program instructions, each program instruction having one or more associated memory addresses;

diagnostic circuitry coupled to said processing circuitry to perform diagnostic operations thereon; and diagnostic control circuitry coupled to said processing circuitry and said diagnostic circuitry and responsive to current values of said virtual machine identifier, said context identifier and at least one of said one or more associated memory addresses to trigger said diagnostic circuitry to perform said diagnostic operations.

In a data processing apparatus with virtual machine capability, each virtual machine can act in a plurality of contexts, each of which can execute a sequence of program instructions associated with one or more memory addresses. The inventors recognized that the context identifiers and program instruction addresses of one virtual machine may inappropriately overlap with those of another virtual machine and that hence there is a need for a virtual machine-aware debug mechanism. By triggering diagnostic circuitry in response to current values of a virtual machine identifier, a context identifier, and at least one of the memory addresses, it is ensured that diagnostic operations are not triggered by mistake, for example when the memory address and context identifier associated with the current program instruction happens to be the same as a memory address and context identifier used by another virtual machine for which a trigger point has been set up. This allows for more efficient analysis of a process within a virtual machine.

It will be appreciated that the diagnostic circuitry could perform many different kinds of diagnostic operations. However, particularly useful operations include triggering the processing circuitry to enter a debug mode, turning a trace module on/off, outputting trace data to an internal or external trace device and triggering a software exception. These operations help with analysis of sequences of program instructions executed by the data processing apparatus.

At least one of the one or more associated memory addresses can be an address of a location in a memory where a program instruction is stored. In this way, the diagnostic circuitry may be triggered to perform diagnostic operations when a program instruction from a predetermined address is executed.

Further, at least one of the one or more associated memory addresses can be an address of a location in a memory accessed by the program instruction. In this way, the diagnostic circuitry may be triggered to perform diagnostic operations when, for example, a data read to a predetermined memory address occurs and/or when a data write to a predetermined memory address occurs.

It will be appreciated by those skilled in the art that the one or more associated memory addresses could be physical or virtual addresses.

Also, the diagnostic control circuitry also can have a plurality of programmable registers storing a trigger point defining value, and said diagnostic control circuitry triggers said diagnostic circuitry to perform said diagnostic operations in response to a comparison of said plurality of trigger point defining values with current values of said virtual machine identifier, said context identifier and said at least one of said one or more associated memory addresses.

The trigger point defining values each represent a breakpoint or a watchpoint, which may be programmed by the user of the system to define the predetermined events which trigger performing the diagnostic operations. This provides a more flexible and efficient diagnostic mechanism. By comparing the values of the virtual machine identifier, the context identifier and the memory addresses with the trigger point defining values, the current state of the processing circuitry determines whether diagnostic operations are triggered.

Viewed from another aspect the technology described in this application provides an apparatus for processing data, comprising:

processing means for performing processing operations and for accessing memory, said processing means being programmable to act as one of a plurality of virtual machines each identified by a virtual machine identifier, each virtual machine acting in one of a plurality of contexts each identified by a context identifier, each context executing a sequence of program instructions, each program instruction having one or more associated memory addresses;

diagnostic means coupled to said processing means for performing diagnostic operations thereon; and diagnostic control means coupled to said processing means and said diagnostic means and responsive to current values of said virtual machine identifier, said context identifier and at least one of said one or more associated memory addresses for triggering said diagnostic means to perform said diagnostic operations.

Viewed from a further aspect the technology described in this application provides a method for processing data, comprising the steps of:

performing processing operations and accessing memory using processing circuitry programmable to act as one of a plurality of virtual machines each identified by a virtual machine identifier, each virtual machine acting in one of a plurality of contexts each identified by a context identifier, each context executing a sequence of program instructions, each program instruction having one or more associated memory addresses;

performing diagnostic operations using diagnostic circuitry coupled to said processing circuitry; and triggering said diagnostic circuitry to perform said diagnostic operations in response to current values of said virtual machine identifier, said context identifier and at least one of said one or more associated memory addresses.

In another aspect of the technology described in this application, there is provided an apparatus for processing data comprising:

processing circuitry configured to perform processing operations and access memory, said processing circuitry operating in one of a plurality of states each identified by at least one of a plurality of state identifiers;

diagnostic circuitry coupled to said processing circuitry to perform diagnostic operations thereon;

diagnostic control circuitry coupled to said processing circuitry and said diagnostic circuitry and having a plurality of programmable registers storing respective trigger point defining values, said diagnostic control circuitry being responsive to a comparison of each of a first subgroup of said plurality of trigger point defining values with a current value of a state characterising value formed of at least part of at least one of said plurality of state identifiers so as to trigger said diagnostic circuitry to perform said diagnostic operations; and global comparison selecting circuitry responsive to a programmable comparison selecting value to select for all of said first subgroup of trigger point defining values which parts of said plurality of state identifiers form said state characterising value.

The data processing apparatus is able to operate in a plurality of states, each state being identified by a plurality of identifiers. By providing a plurality of programmable registers storing trigger point defining values which are compared with the current state of the system, characterised by a state characterising value, it is possible to trigger a diagnostic circuitry to perform diagnostic operations depending on the state of the processing circuitry. The state characterising value is formed from at least part of at least one of the plurality of state identifiers. Using the global comparison selecting circuitry, the user can set which parts of the state identifiers form the state characterising value. This allows a high degree of flexibility in setting the triggering conditions for a trigger point. Also, the technology described in this application realises that often the same combination of identifiers will be used for comparison with each trigger point defining value, and that it is unnecessary to provide a comparison selecting circuit for each trigger point defining value. Thus, a reduction in circuit overhead is achieved by using a global comparison selecting which selects for all of the first subgroup of trigger point defining values which combination of state identifiers are used to form the state characterising value.

It will be appreciated that the diagnostic circuitry could perform many different kinds of diagnostic operations. However, particularly useful operations include triggering the processing circuitry to enter a debug mode, turning a trace module on/off, outputting trace data to an internal or external trace device and triggering a software exception. These operations help with analysis of sequences of program instructions executed by the data processing apparatus.

Further, the processing circuitry may be programmable to act as one of a plurality of virtual machines each identified by a virtual machine identifier, each virtual machine acting in one of a plurality of contexts each identified by at least one context identifier.

A virtual machine allows a processor to replicate the features of itself or another data processing apparatus. For example, this allows a processor to provide the illusion of multiple homogeneous machines or to emulate a different processor type. Each virtual machine may act in one of a plurality of contexts, each context allowing a different set of functions to be carried out. Each virtual machine and context is identifiable by their respective identifiers.

It will be appreciated that the plurality of state identifiers may include any value describing the state of the processing apparatus. However, particularly useful state identifiers include said virtual machine identifier and said at least one context identifier, each state being identified by a combination of said virtual machine identifier and said at least one context identifier.

By describing the state of the processing circuitry using a combination of the virtual machine identifier and the at least one context identifier, trigger points may be arranged which compare the trigger point defining values with at least part of at least one of the virtual machine identifier and the at least one context identifier, such that the conditions for triggering diagnostic operations are dependent upon the current state of the processing circuitry.

In some embodiments, each of said plurality of contexts is identified by at least one of a first context identifier and a second context identifier. The second context identifier is unique to each context. In known processors, a context may be identified by a single type of context identifier, part of which also functions as an application space identifier (ASID). However, the ASID is used to avoid translation lookaside buffer (TLB) flushing, which could limit the ASID to a size smaller than that which might accommodate a unique value for every process. As a result, some operating systems recycle ASIDs, and so each process may not have a unique context identifier for the entire lifetime of the process, and furthermore at least part of the context identifier to which the hardware is responsive may not be unique to each process. By providing a second context identifier which is unique to each context, this allows contexts to be accurately identified. It could be possible to stop comparing the trigger point defining values with the first context identifier. However, by allowing the context to be identified by both the first and the second context identifiers the processing apparatus is able to be backwards compatible so that it may execute legacy code which has been written for previous processors which only use the first context identifier.

The diagnostic control circuitry also has a plurality of programmable control registers storing respective trigger point control values, each trigger point control value being associated with one of said trigger point defining values. By providing each trigger point control value with an associated programmable control register, the user can define the way in which the trigger point control values are used, as will be described hereafter.

In a first embodiment, the global comparison selecting circuitry selects said state characterising value to be formed from one of:

the whole of a current value of said first context identifier; or the whole of a current value of said second context identifier.

The inventors recognized that it is unlikely that a user would require some of the trigger point defining values to be compared with the first context identifier and others to be compared with the second context identifier. Often, the user will want to use either the first context identifier, for example if dealing with legacy code written for an older processor, or the second context identifier. Thus, it is advantageous to be able to set globally which context identifier should be used for each trigger point. This is done by setting the value of the programmable comparison selecting value.

Further, the diagnostic control circuitry also has a second plurality of programmable registers storing respective virtual machine trigger point defining values, each virtual machine trigger point defining value being associated with one of said first subgroup of trigger point defining values and a respective one of said trigger point control values.

By providing a second group of programmable registers which are each associated with one of the first subgroup of trigger point defining values, each trigger point may be both context-aware and virtual machine-aware. Since the virtual machine trigger point defining values are provided in separate registers from the registers storing the trigger point defining values, it is possible to trigger performing diagnostic operations responsive to the whole of the virtual machine identifier and the whole of one of the context identifiers.

For each virtual machine trigger point defining value, said diagnostic control circuitry is selectively responsive to a comparison of said virtual machine trigger point defining value with a current value of said virtual machine identifier so as to trigger said diagnostic circuitry to perform said diagnostic operations.

In this way, diagnostic operations may be triggered in response to both a comparison of the trigger point defining value with the state characterising value (selected from either the first or the second context identifier) and, if selected, a comparison of the associated virtual machine trigger point defining value with the current value of the virtual machine identifier.

For each virtual machine trigger point defining value, said diagnostic control circuitry is responsive to said trigger point control value associated with said virtual machine trigger point defining value so as to select whether or not said diagnostic control circuitry is responsive to said comparison of said virtual machine trigger point defining value with said current value of said virtual machine identifier. Thus, the user may program the trigger point control value to select whether a comparison of the virtual machine trigger point defining value with the current value of the virtual machine identifier is required or not.

In a second embodiment, said global comparison selecting circuitry selects said state characterising value to be formed from parts of at least one of a current value of said first context identifier, a current value of said second context identifier, a current value of said virtual machine identifier and a masking value.

This allows for a reduction in circuit overhead, because whether or not the virtual machine identifier is selected for comparison is also set globally. No registers for storing virtual machine trigger point defining values are required. Also, by allowing a masking value to form part of the state characterising value so that some bits of the state characterising value are masked, this makes it possible to form a state characterising value from one or more identifiers even if the total length of the one or more identifiers is smaller than the length of the state characterising value and the trigger point defining value.

Also, the programmable comparison selecting value has a plurality of fields, and each field indicates from which one of said current value of said first context identifier, said current value of said second context identifier, said current value of said virtual machine identifier and said masking value a corresponding part of said state characterising value is selected.

The user is able to program the fields of the programmable comparison selecting value so that each part of the state characterising value is made up of part of one of the plurality of state identifiers or the masking value. This allows for a high degree of flexibility, enabling the user to set different combinations of identifiers for comparing the trigger point defining values with in order to trigger diagnostic operations to be performed.

In some embodiments, each context executes a sequence of program instructions, each program instruction having one or more associated memory addresses. Thus, each context may have associated functions which it carries out by executing the sequence of program instructions associated with that context.

Further, the diagnostic control circuitry is responsive to a comparison of each of a second subgroup of said plurality of trigger point defining values with one of said one or more associated memory addresses so as to trigger said diagnostic circuitry to perform said diagnostic operations.

Whereas the first subgroup of trigger point defining values are compared with the state characterising value which characterises the current state of the processing circuitry, the second subgroup of trigger point values is compared with one of the one or more associated memory addresses. Thus, the diagnostic circuitry may be triggered to perform diagnostic operations when a predetermined memory address is accessed.

One of the one or more associated memory addresses can be an address of a location in a memory where the program instruction is stored. In this way, the diagnostic circuitry may be triggered to perform diagnostic operations when a program instruction from a predetermined memory address is executed.

Further, one of the one or more associated memory addresses can be an address of a location in a memory accessed by the program instruction. In this way, the diagnostic circuitry may be triggered to perform diagnostic operations when, for example, a data read to a particular memory address occurs and/or when a data write to a predetermined memory address occurs.

At least one of said second subgroup of trigger point defining values can define a predetermined range of memory addresses, with said diagnostic control circuitry being responsive to whether or not said one of said one or more associated memory addresses is within said predetermined range of memory addresses so as to trigger said diagnostic circuitry to perform said diagnostic operations.

It is possible that at least one of said second subgroup of trigger point defining values can include a pair of address values indicating the upper and lower bounds of said predetermined address range.

Alternatively, at least one of said second subgroup of trigger point defining values can include an address value and a mask, and said diagnostic control circuitry is responsive to the result of comparing said address value with a masked address value obtained by performing a bitwise mask operation on said one of said one or more associated memory addresses using said mask.

Each of said second subgroup of trigger point defining values can be selectively linked to one of said first subgroup of trigger point defining values, such that said diagnostic control circuitry is responsive to both said comparison of said first trigger point defining value with said state characterising value and said comparison of said second trigger point defining value with said one of said one or more associated memory addresses so as to trigger said diagnostic circuitry to perform said diagnostic operations.

In this way, diagnostic operations may be triggered when a predetermined address in memory is accessed so that the predetermined address matches the one of the second subgroup trigger point defining values and the state characterising value matches the one of the first subgroup of trigger point defining values which is linked to the trigger point defining value of the second subgroup. Thus, any combination of the associated address, the context identifiers and virtual machine identifier may be used to trigger the diagnostic circuitry to perform diagnostic operations.

In another feature, more than one of said second subgroup of trigger point defining values can be linked to one of said first subgroup of trigger point defining values.

The result is that a context/virtual machine-aware trigger point of the first subgroup does not need to be defined for every address-aware trigger point defining value of the second subgroup. Accordingly, the apparatus requires a reduced circuit overhead.

Further, the diagnostic control circuitry is responsive to each of said trigger point control values to select whether said trigger point defining value associated with said trigger point control value is a member of said first subgroup of trigger point defining values or said second subgroup of trigger point defining values.

This allows the user to select which trigger point defining values are members of the first subgroup and which trigger point defining values are members of the second subgroup. This provides a greater degree of flexibility to the user. As each context/virtual machine-aware trigger point may have several address-aware trigger points linked to it, it would generally be expected that there would be more trigger point defining values in the second subgroup than in the first subgroup, but this need not necessarily be the case. Thus to reduce circuit complexity some of the programmable registers may be restricted as to which subgroup the respective trigger point defining value belongs.

In a further feature, the diagnostic control circuitry is responsive to each of said trigger point control values to select whether said trigger point defining value associated with said trigger point control value is linked to another of said trigger point defining values.

In this way, the user may select to link one trigger point defining value to another trigger point defining value. Alternatively, a trigger point defining value can be set not to be linked to any other trigger point defining values so that, for example, one of the second subgroup of trigger point defining values can be set up so that diagnostic operations are triggered when a predetermined address is accessed regardless of what the current state of the processing circuitry is.

In another feature, for each trigger point defining value of said second subgroup of trigger point defining values, said diagnostic control circuitry is responsive to said trigger point control value associated with said trigger point defining value of said second subgroup to select which of said first subgroup of trigger point defining values is linked to said trigger point defining value of said second subgroup. In this way the user may program the way in which trigger point defining values of each subgroup are linked.

Also, the diagnostic control circuitry is responsive to each of said trigger point control values to select whether to trigger said diagnostic circuitry to perform said diagnostic operations when:

the result of a comparison is a match; or
the result of a comparison is a mismatch.

It would be expected that most of the time the user would desire trigger points to trigger diagnostic operations when, for example, the current state of the system or one of the associated addresses matches a trigger point defining value. However, it is also possible to allow the user to set trigger points which trigger diagnostic operations to be performed when the current state of the system, such as a context identifier or one of the associated addresses does not match a trigger point defining value. For example, this would be particularly useful if the user desires the system to trigger diagnostic operations for all addresses within a predetermined context except one address. If it was not possible for the user to select that diagnostic operations are triggered when the result of a comparison is a mismatch, then in this example the user would need to set trigger point defining values for each of the addresses other than the one for which diagnostic operations are not desired. This would require greater circuit resource. Allowing diagnostic operations to be triggered when the result of a comparison is a mismatch addresses this problem.

Also, the result of said comparison can be a mismatch in virtual machine identifier.

Viewed from a further aspect, the technology described in this application provides an apparatus for processing data, comprising:

processing means for performing processing operations and for accessing memory, said processing means operating in one of a plurality of states each identified by at least one of a plurality of state identifiers;

diagnostic means coupled to said processing means for performing diagnostic operations thereon;

diagnostic control means coupled to said processing means and said diagnostic means and having a plurality of programmable registers storing respective trigger point defining values, said diagnostic control means being responsive to a comparison of each of a first subgroup of said plurality of trigger point defining values with a current value of a state characterising value formed of at least part of at least one of said plurality of state identifiers so as to trigger said diagnostic means to perform said diagnostic operations; and global comparison selecting means responsive to a programmable comparison selecting value for selecting for all of said first subgroup of trigger point defining values which parts of said plurality of state identifiers form said state characterising value.

Viewed from another aspect, the technology described in this application provides a method for processing data, comprising the steps of:

performing processing operations and accessing memory using processing circuitry operating in one of a plurality of states each identified by at least one of a plurality of state identifiers;

performing diagnostic operations on said processing circuitry using diagnostic circuitry coupled to said processing circuitry;

triggering said diagnostic circuitry to perform said diagnostic operations in response to a comparison of each of a first subgroup of a plurality of trigger point defining values with a current value of a state characterising value formed of at least part of at least one of said plurality of state identifiers; and selecting for all of said first subgroup of trigger point defining values which parts of said plurality of state identifiers form said state characterising value in response to a programmable comparison selecting value.

The above, and other objects, features and advantages will be apparent from the following detailed description of illustrative embodiments which is to be read in connection with the accompanying drawings.

DESCRIPTION OF EXAMPLE EMBODIMENTS

Figure 1:
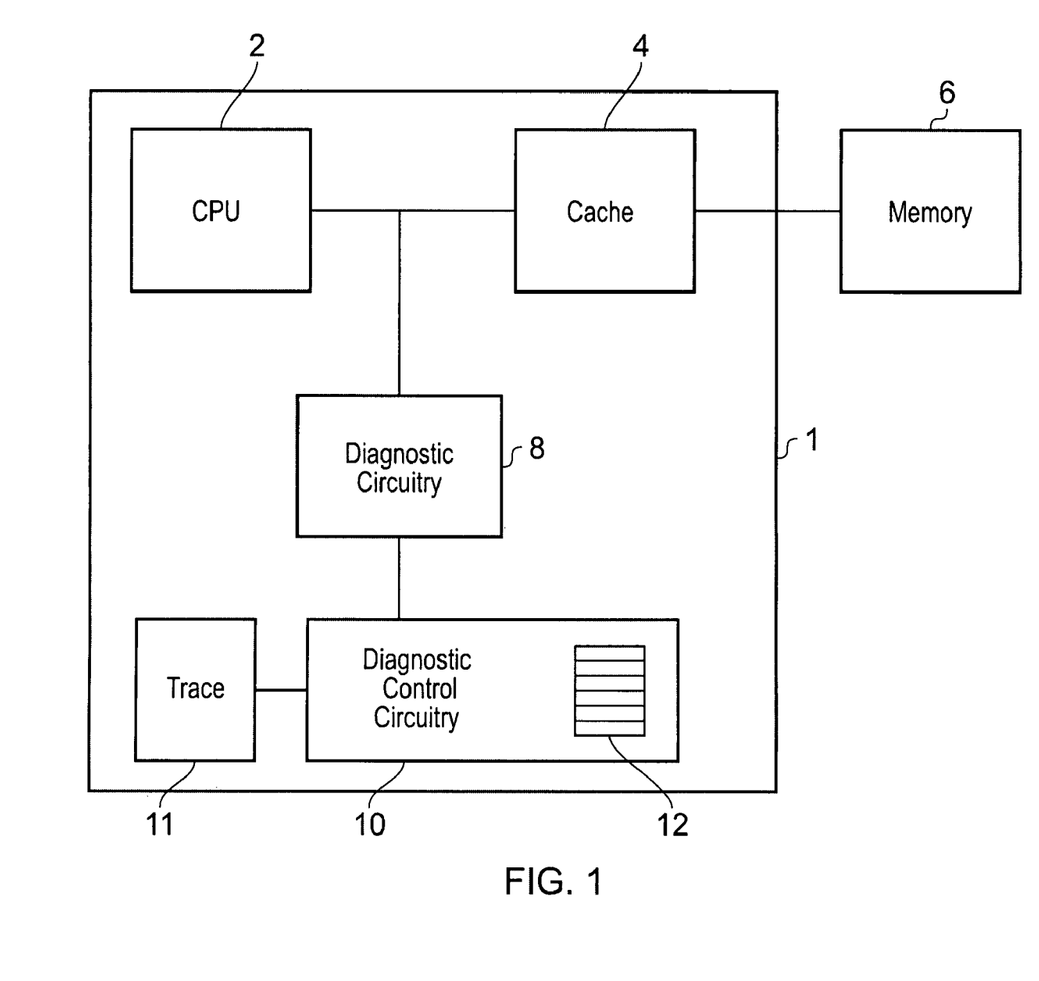
FIG. 1 schematically illustrates a data processing system including diagnostic circuitry and diagnostic control circuitry.

FIG. 1 schematically illustrates a data processing system 1 including a processor core 2 and a cache memory 4. The data processing system 1 is coupled to a main memory 6. The data processing system 1 also includes diagnostic circuitry 8 for performing diagnostic operations on the processor core. Also included within the data processing system 1 is diagnostic control circuitry 10 coupled to the diagnostic circuitry 8 for controlling the diagnostic circuitry. The diagnostic control circuitry 10 has a bank of programmable registers 12. It will be appreciated by those in this technical field that in practice the data processing system 1 will typically contain many further circuit elements performing different functions, but these have not been shown in FIG. 1 for the sake of simplicity.

The processor core 2 may be programmed to act as a virtual machine so that it reproduces the functions of itself or of another machine. Each virtual machine is identified by an eight-bit virtual machine identifier (VMID). The VMID of the virtual machine which the processor core is currently emulating as can be stored in an eight-bit register (VMIDR) within the data processing system 1.

For each virtual machine, the processor core 2 is able to operate in a number of states known as contexts. Each context is associated with a sequence of program instructions executed in turn and is identified by a 32-bit context identifier (CONTEXTID). The context ID of the context in which the processor core is currently acting is stored in a 32-bit register (CONTEXTIDR). In a system using virtual addressing, the different contexts share the virtual address space. The least significant eight bits of the context ID are used as an application space identifier (ASID) tag by the processor. The ASID may be used, example, for in translation lookaside buffer entries.

In some operating systems, ASID values are recycled, and hence during the life of a context it may have several different ASID values and each ASID value may not be unique to a single context. For this reason, a debug unique identifier (DBGUID) is provided which is unique to each context. This is a 32-bit value which has no overloaded meaning. The DBGUID of the context in which the processor core 2 is currently acting is stored in a 32-bit register (DBGUIDR). The operating system and the diagnostic control circuitry may co-operate in setting this register to any suitable value.

By providing a number of state identifiers (VMID, CONTEXTID/ASID and DBGUID) for each virtual machine and each context, different states of the processor core 2 can be identified. Thus, the processor core 2 can distinguish between data at the same virtual address in different virtual machines and/or contexts. One use of this would be to avoid a virtually addressed translation lookaside buffer being flushed every time there is a context switch or a virtual machine switch. It will be appreciated by those skilled in the art that other identifiers could also be used to describe the state of the system, for example a thread ID.

The diagnostic circuitry 8 may perform a variety of diagnostic operations to enable analysis of execution of sequences of program instructions by the processor core 2. These operations may include, for example, triggering the processor core to enter debug mode, turning a trace module 11 on/off, outputting trace data to an internal or external trace device or triggering a software exception. However, it will be appreciated that other diagnostic operations are also possible.

The diagnostic control circuitry 10 is used to trigger the diagnostic circuitry 8 to perform diagnostic operations when a predetermined event occurs. The programmable registers 12 of the diagnostic control circuitry may be programmed by the user to define the predetermined events which trigger diagnostic operations.

Figure 2:
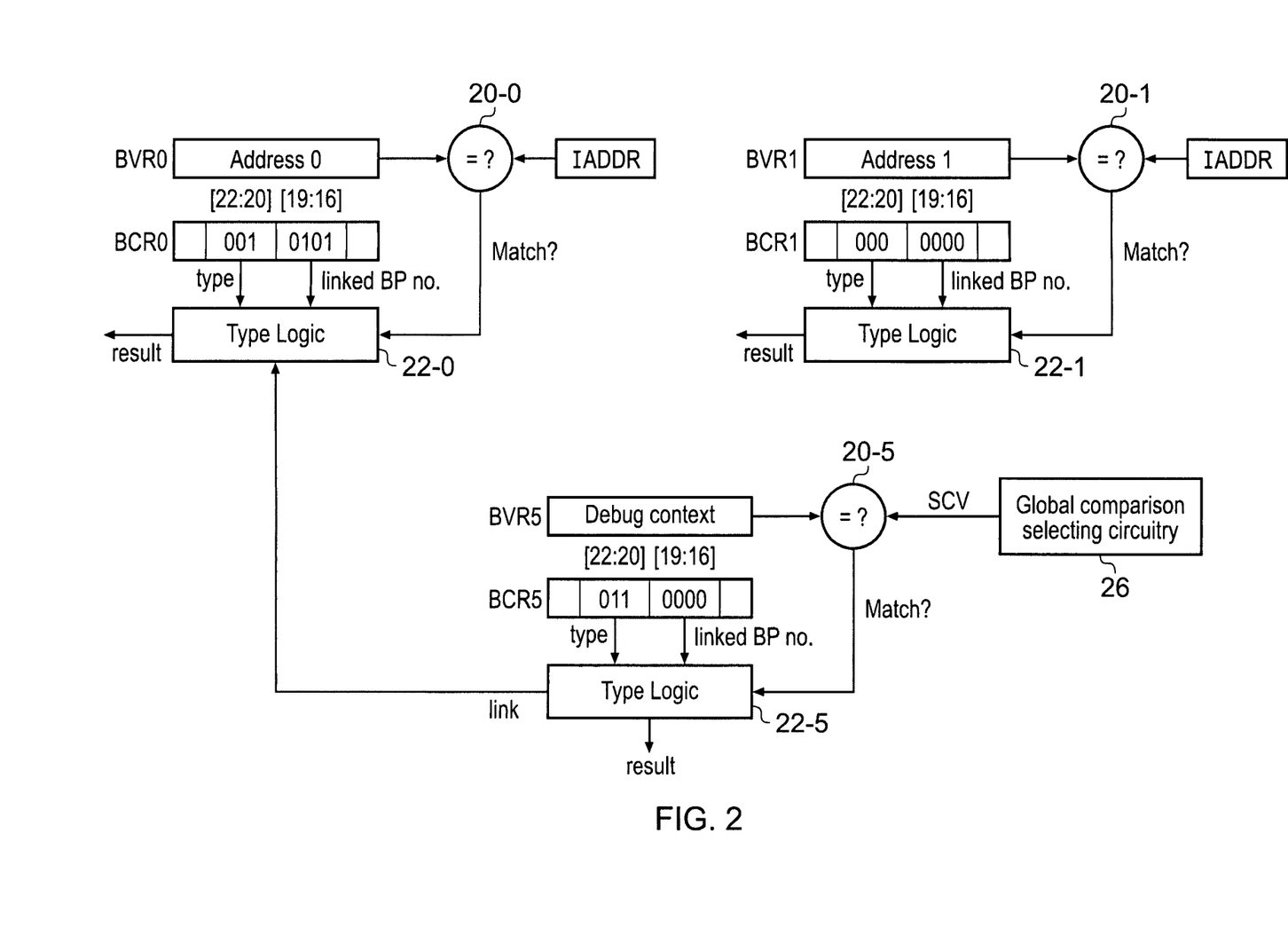
FIG. 2 schematically illustrates diagnostic control circuitry for triggering diagnostic circuitry to perform diagnostic operations.

FIG. 2 schematically illustrates the diagnostic control circuitry 10 in more detail. The programmable registers 12 of the diagnostic control circuitry are logically arranged in pairs, each pair representing a breakpoint or a watchpoint. For conciseness, each pair of registers will hereafter be referred to as a breakpoint. However it will be apparent to the skilled person that each pair could also represent a watchpoint. One register BVR0, BVR1, BVR5 in each pair is called a breakpoint value register and stores a predetermined breakpoint value. The other register in each pair is called a breakpoint control register BCR0, BCR1, BCR5 and is used to define the properties of each breakpoint.

Breakpoints may be of different types. For a first subgroup of breakpoints the breakpoint value register BVR5 contains a debug context value which defines a predetermined context state of the system. These breakpoints are state-aware breakpoints. The value stored in the breakpoint value register is compared with a state characterising value SCV using a comparator 20-5. The state characterising SCV is a value representing the current state of the system. The comparator 20-5 outputs a result corresponding to whether or not the value stored in the breakpoint value register matches the state characterising value.

For a second subgroup of breakpoints the breakpoint value register BVR0, BVR1 contains an address Address0, Address1 of a predetermined location in memory. These breakpoints are address-aware breakpoints. The value stored in the breakpoint value register is compared with the current program instruction address IADDR using a comparator 20-0, 20-1. The comparator 20-0, 20-1 outputs a result corresponding to whether or not the value stored in the breakpoint value register matches the program instruction address. For a watchpoint, the value stored in the breakpoint value register may be compared with an address of a location in memory accessed by the current program instruction.

In some embodiments, it is possible for the breakpoint value register of an address-aware breakpoint to define a predetermined range of memory addresses. Thus, the diagnostic operations can be triggered when an access is made to an address within the predetermined range. There are several ways in which the range could be defined. It is possible that the breakpoint value register could include a pair of address values indicating the upper and lower bounds of the address range respectively. Alternatively, the breakpoint value register could include an address value and a mask. The breakpoint would then be configured so that the comparator performs a bitwise mask operation on the accessed memory address before comparing it with the address value. Those skilled in the filed will appreciate that the mask could be defined as a bitwise mask with each bit corresponding to a bit in the accessed address, or as a propriety field encoding the most significant bit index of the mask value.

Hereafter, for simplicity, the address-aware breakpoints referred to in the description will be of the type where the breakpoint value register contains a single address value. However, it will be apparent that they could equally well define a range of memory addresses as described above.

Each breakpoint is associated with type logic 22-0, 22-1, 22-5 which is responsive to the output of the associated comparator 20-0, 20-1, 20-5 and responsive to the associated breakpoint control register BCR0, BCR1, BCR5. The type logic 22-0, 22-1, 22-5 outputs a result depending on the properties of the breakpoint as defined by the breakpoint control register and corresponding to whether the result output from the comparator 20-0, 20-1, 20-5 corresponds to a match or a mismatch. The result output by the type logic 22-0, 22-1, 22-5 is used by the diagnostic control circuitry 10 to select whether to trigger the diagnostic circuitry 8 to perform the diagnostic operations.

Address-aware breakpoints may be linked to state-aware breakpoints. In FIG. 2, for example, one address-aware breakpoint BVR0, BCR0 is linked to a state-aware breakpoint BVR5, BCR5. However, it is possible that more than one address-aware breakpoint is linked to the same state-aware breakpoint.

Because in this example the state-aware breakpoint BVR5, BCR5 has one or more address-aware breakpoints (that is, address aware breakpoint BVR0, BCR0) linked to it, the type logic 22-5 associated with the state-aware breakpoint will not output a result to trigger the diagnostic circuitry 8. Instead, the output of the type logic 22-5 is routed back to the type logic 22-0 associated with each of the one or more address-aware breakpoints that are linked to the state-aware breakpoint. The type logic 22-0 then outputs a result depending on the result of the comparator 20-0 and the result routed from the type logic 22-5. In this way, the diagnostic circuitry 8 may be triggered to perform diagnostic operations depending on whether or not the address associated with the current program instruction matches a predetermined address and whether or not the current state of the system matches a predetermined debug context value. For example, the breakpoints can be arranged to trigger the diagnostic circuitry 8 when an instruction at a predetermined address in a predetermined context is executed.

Each breakpoint control register BCR0, BCR1, BCR5 controls how the associated type logic 22-0, 22-1, 22-5 uses the result of the comparator 20-0, 20-1, 20-5. Three bits of the breakpoint control register, for example bits 22 to 20, are used as a type field. Four bits of the breakpoint control register, for example bits 19 to 16, are used as a linked breakpoint number field. The values of the type field and linked breakpoint number field are passed to the type logic 22-0, 22-1, 22-5 and are used to control the behaviour of the type logic.

Bit 22 of the breakpoint control register BCR0, BCR1, BCR5 is used to select whether diagnostic operations are triggered when the result of a comparison is a match or when the result of the comparison is a mismatch. This bit is set to 1 for triggering diagnostic operations when a mismatch occurs and 0 for triggering diagnostic operations when a match occurs. In some embodiments the mismatch function is only supported for address-aware breakpoints. In this case for a state-aware breakpoint, bit 22 must not be set to 1, and for watchpoints bit 22 is fixed at zero. It will be appreciated that it is possible to support the mismatch function for both state-aware breakpoints and watchpoints if so desired.

Bit 21 of the breakpoint the breakpoint control register BCR0, BCR1, BCR5 is used to select whether a breakpoint is an address-aware breakpoint or a state-aware breakpoint. This bit is set to 1 for a state-aware breakpoint, so that the breakpoint value register stores a predetermined debug context value which is compared with the state characterising value. This bit is set to 0 for an address-aware breakpoint, so that the breakpoint value register stores a predetermined address value which is compared with either the current program instruction address (for a breakpoint). If the individual breakpoint does not support being selected as a state-aware breakpoint, this bit is fixed at 0. For a watchpoint, that is where the watchpoint value register contains an address which is accessed by the current program instruction this bit is fixed at 0.

Bit 20 of the breakpoint control register BCR0, BCR1, BCR5 is used to set whether or not a breakpoint is linked; that is, for an address-aware breakpoint or watchpoint whether the breakpoint or watchpoint is linked to a second state-aware breakpoint and for a state-aware breakpoint whether the breakpoint is linked to by one or more address-aware breakpoints or watchpoints. In this way a breakpoint can be set so that it requires both an address comparison and a debug context comparison. This bit is set to 1 if a breakpoint is linked. This bit is set to 0 if a breakpoint is not linked.

Figure 3:
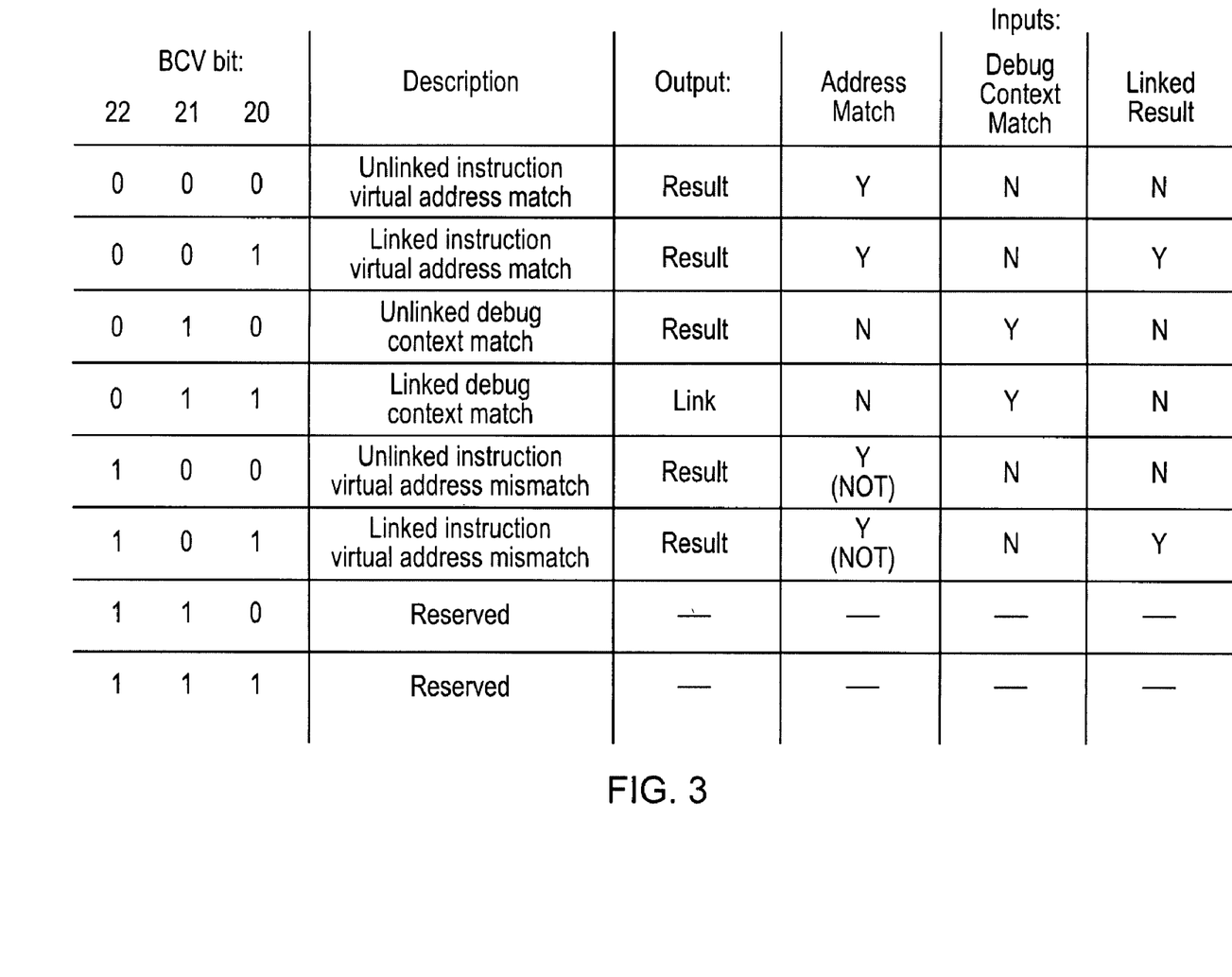
FIG. 3 shows possible meanings of the type field of a breakpoint control register.

FIG. 3 shows possible meanings of the type field of the breakpoint control register. In the following section, x represents the breakpoint number of any address-aware breakpoint and y represents the breakpoint number of any state-aware breakpoint. Possible values of the type field are:

0b000—unlinked instruction virtual address match

In this case the type logic 22-$x$ of this address-aware breakpoint outputs a result which causes diagnostic operations to be triggered in the event that the comparison made by comparator 20-$x$ of the value stored in the breakpoint value register with the current program instruction address is a match.

0b001—linked instruction virtual address match
In this case the type logic 22-x of this address-aware breakpoint receives a result from the type logic 22-y of a state-aware breakpoint linked to the address-aware breakpoint. The type logic 22-x of the address-aware breakpoint outputs a result triggering diagnostic operations if the comparison made by comparator 20-x of the address is a match and the result of the comparison made by the linked state-aware breakpoint is a match.

0b010—unlinked debug context match
In this case the type logic 22-y of this state-aware breakpoint outputs a result which causes diagnostic operations to be triggered in the event that the comparison made by comparator 20-y of the value stored in the breakpoint value register with the state characterising value is a match.

0b011—linked debug context match
In this case the type logic 22-y of this state-aware breakpoint routes the result of the comparison made by comparator 22-y of the value stored in the breakpoint value register with the state characterising value to the type logic 22-x of an address-aware breakpoint linked to the state-aware breakpoint.

0b100—unlinked instruction virtual address mismatch
In this case the type logic 22-x of this address-aware breakpoint outputs a result which causes diagnostic operations to be triggered in the event that the comparison made by the comparator 20-x of the value stored in the breakpoint value register with the current program instruction address is a mismatch.

0b101—linked instruction virtual address mismatch
In this case the type logic 22-x of this address-aware breakpoint receives a result from the type logic 22-y of a state-aware breakpoint linked to the address-aware breakpoint. The type logic 22-x of the address-aware breakpoint outputs a result triggering diagnostic operations if the comparison made by the comparator 20-x of the address is a mismatch and the result of the comparison made by the linked state-aware breakpoint is a match.

0b110—unlinked debug context mismatch—reserved
0b111—linked debug context mismatch—reserved These last two cases are not supported in some embodiments. However, it will be appreciated that these could be supported if desired.

The linked breakpoint number field is used to indicate which state-aware breakpoint is linked to an address-aware breakpoint. For a state-aware breakpoint the linked breakpoint number field is always set to 0b0000. For an address-aware breakpoint which is not linked to a state-aware breakpoint the linked breakpoint number field is set to 0b0000. For an address-aware breakpoint which is linked to a state-aware breakpoint, the linked breakpoint number field contains a value indicating the number of the state-aware breakpoint which is linked to the address-aware breakpoint. For example, in FIG. 2 breakpoint BVR0, BCR0 is linked to breakpoint BVR5, BCR5, and so the linked breakpoint number field of BCR0 is set to 0b0101.

By setting bits of the breakpoint control register in this way, the user can set different types of breakpoint.

For a state-aware breakpoint, the debug context value stored in the breakpoint value register BVR5 is compared with a state characterising value SCV (with reference to FIG. 2). The state characterising value is set for all state-aware breakpoints by a global comparison selecting circuitry 26. This allows the user to set which state identifiers are used to form the state characterising value. By selecting globally which state identifiers are used, this means less circuit resource is required than if comparison selecting circuitry was provided for each breakpoint.

Figure 4:
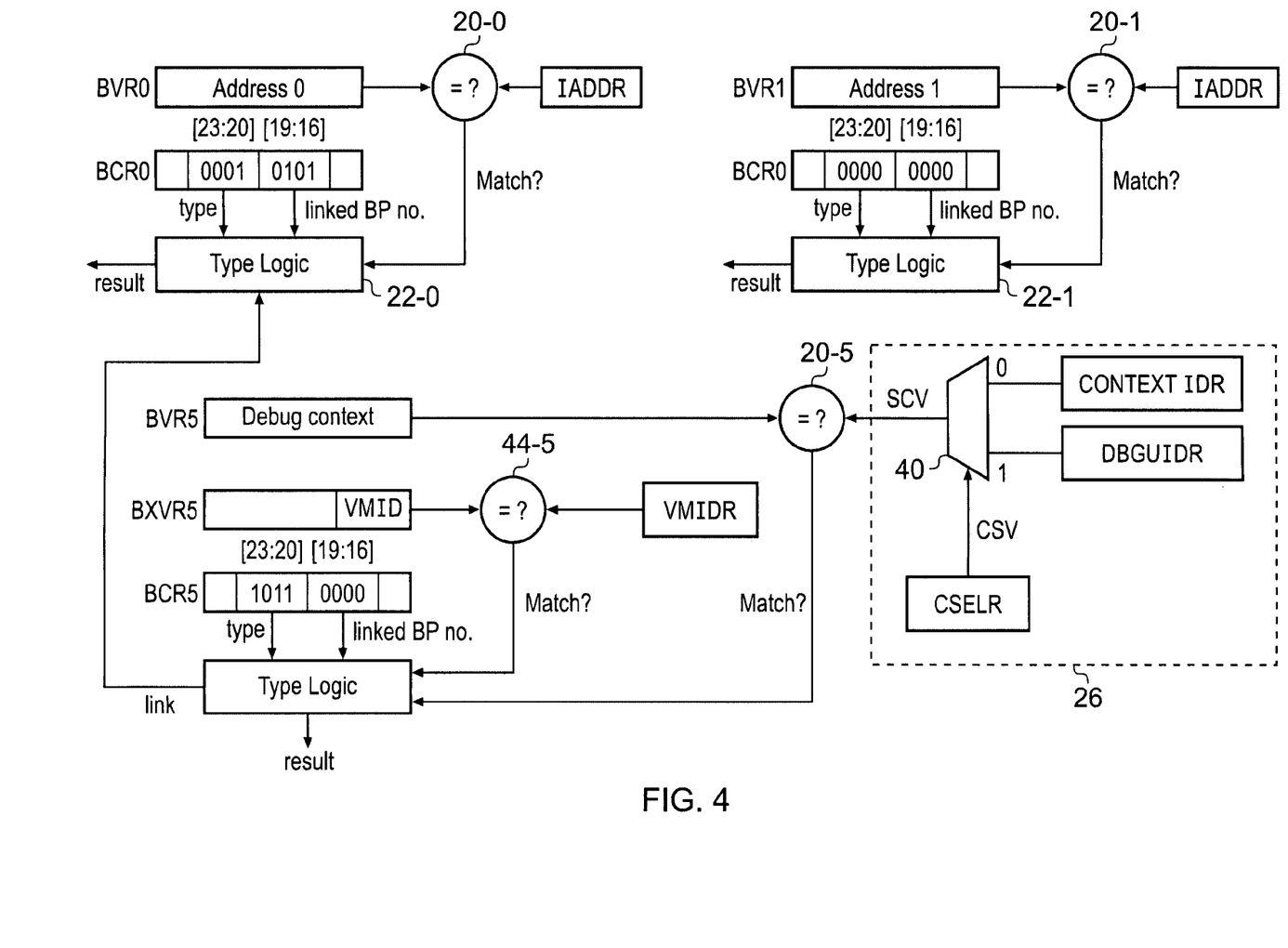
FIG. 4 schematically illustrates a first example embodiment of a global comparison selecting circuitry.

One example embodiment of the global comparison selecting circuitry 26 is described with reference to FIG. 4. The features of FIG. 4 which are the same as those in FIG. 2 are identified with the same reference numerals.

In this embodiment, the global comparison selecting circuitry 26 has a selector 40 which is responsive to the value of a programmable comparison selecting value CSV stored in a comparison selection register CSELR. If the value of the comparison selecting value is 1, then the selector 40 outputs the value of the DBGUID stored in the DBGUIDR. If the value of the comparison selecting value is 0, then the selector 40 outputs the value of the CONTEXTID stored in the CONTEXTIDR. The value output by the selector 40 is used as the state characterising value for comparing with the debug context value stored in the breakpoint value register BVR5 of a state-aware breakpoint. In this way, the user may select globally which of the CONTEXTID and the DBGUID should be used to identify a context.

In order for the state-aware breakpoints to be virtual machine-aware as well as context-aware, an additional breakpoint value register BXVR5 and additional comparator 44-5 is provided for each state-aware breakpoint. The additional breakpoint value register BXVR5 stores a predetermined value which represents a VMID for which diagnostic operations are to be triggered. The comparator 44-5 compares the value stored in the additional breakpoint value register with the value stored in the VMIDR which represents the current VMID (the VMID of the virtual machine the processor is currently programmed to act as). The comparator 44-5 outputs a result indicating whether the value stored in the additional breakpoint value register BXVR5 matches or mismatches the current VMID. The type logic is selectively responsive to the output of the comparator 44-5. By providing the additional breakpoint value register and comparator, the present technique allows breakpoints to be set up which trigger diagnostic operations in response a comparison of the full values of both the VMID and one of the context identifiers with predetermined values.

In the breakpoint control registers, an additional bit, for example bit 23, is used to set whether or not the associated type logic is responsive to the result of the VMID comparison. When this bit is set to 1 the type logic is responsive to the output of the comparator 44-5. When this bit is set to 0 the type logic is not responsive to the output of the comparator 44-5.

Figure 5:
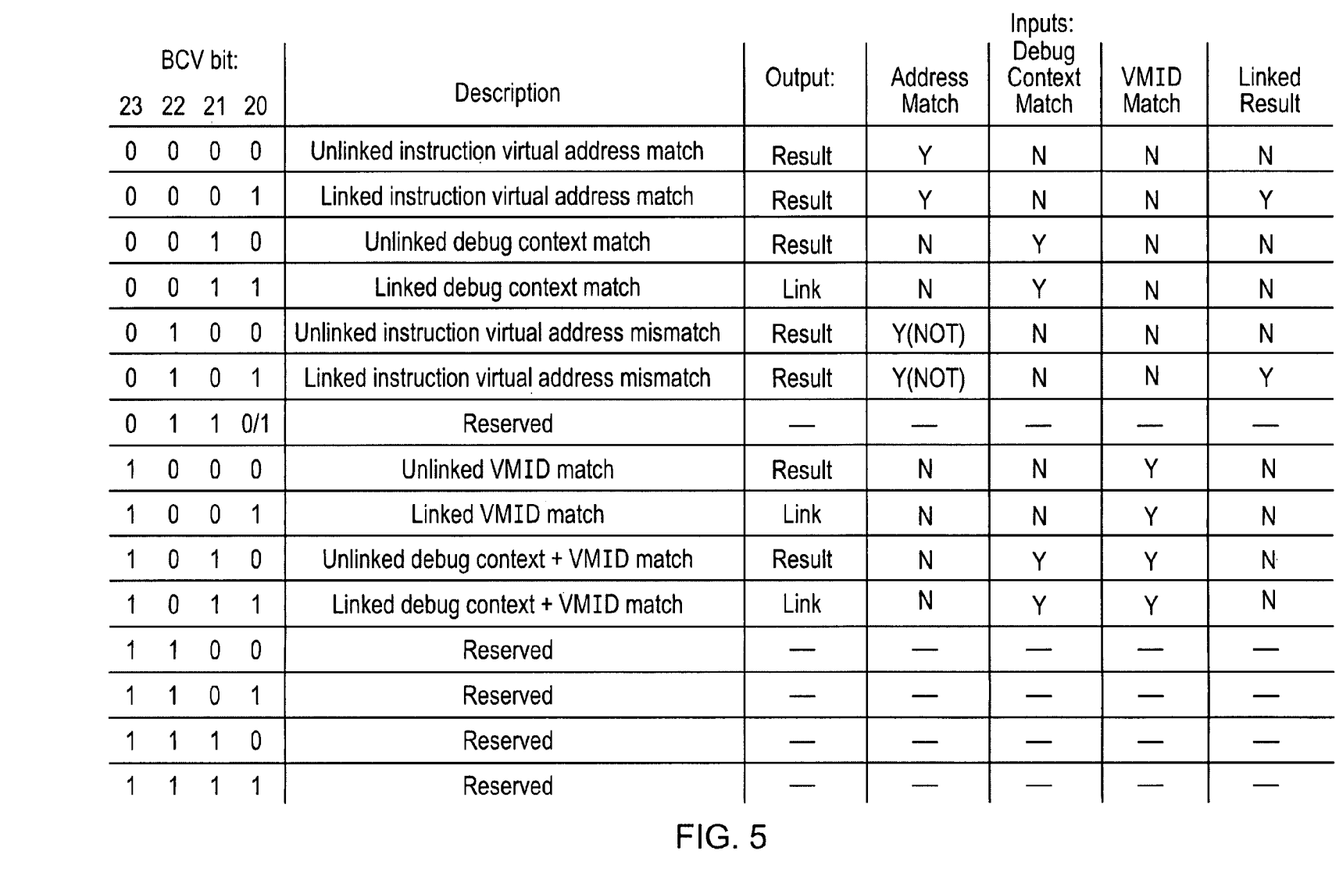
FIG. 5 shows possible meanings of the type field of a breakpoint control register in the first example embodiment.

FIG. 5 shows possible meanings of the type field of the breakpoint control register in this embodiment. Values 0b0000 to 0b0111 have the same meanings as the respective values 0b000 to 0b111 discussed with reference to FIG. 3. For the types 0b0100 to 0b0101 the value in BXVR5 and the current VMID are ignored.

0b1000—unlinked VMID match
In this case the type logic 22-y of this state-aware breakpoint outputs a result which causes diagnostic operations to be triggered in the event that the comparison made by comparator 44-y of the value stored in the additional breakpoint value register BXVRy with the current VMID is a match. The debug context value stored in the breakpoint value register BVR5 is ignored.

0b1001—linked VMID match
In this case the type logic 22-y of this state-aware breakpoint routes the result of the comparison made by comparator 44-y of the value stored in the additional breakpoint value register with the current VMID to the type logic 22-*x* of an address-aware breakpoint linked to the state-aware breakpoint.

0b1010—unlinked debug context and VMID match

In this case the type logic 22-*y* of this state-aware breakpoint outputs a result which causes diagnostic operations to be triggered in the event that the debug comparison made by the comparator 20-*y* of the debug context value stored in the breakpoint value register BVRy with the state characterising value SCV is a match and the comparison made by comparator 44-*y* of the value stored in the additional breakpoint value register BXVRy and the current VMID is a match.

0b1011—linked debug context and VMID match

In this case the type logic 22-*y* of this state-aware breakpoint routes the result of the comparisons made by comparators 20-*y* and 44-*y* to the type logic 22-*x* of an address-aware breakpoint linked to the state-aware breakpoint.

0b1100—unlinked VMID mismatch—reserved

0b1101—linked VMID mismatch reserved

0b1110—unlinked debug context and VMID mismatch—reserved

0b1111—linked debug context and VMID mismatch—reserved.

The last four cases are not supported in some embodiments. However it is possible to support these cases if desired.

Thus, by setting the bits of the type field of the breakpoint control register in the appropriate way, breakpoints can be set up which can trigger diagnostic operations to be performed based on any combination of instruction address, VMID and CONTEXTID/DBGUID. The full values of both the VMID and the CONTEXTID/DBGUID may be compared with values stored in the breakpoint value registers.

Figure 6:
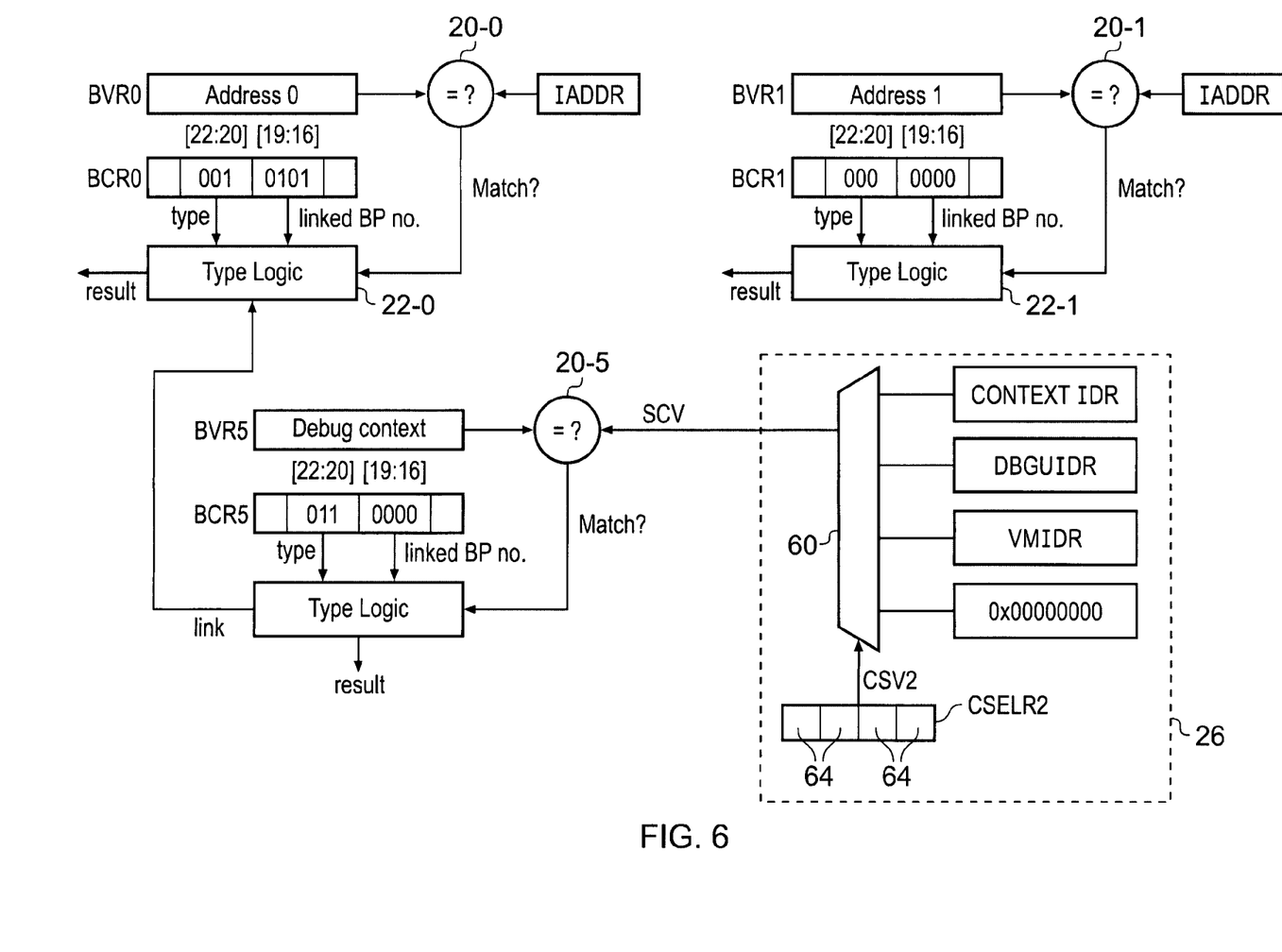
FIG. 6 schematically illustrates a second example embodiment of a global comparison selecting circuitry.

In an alternative embodiment, the global comparison selecting circuitry 26 is arranged as illustrated schematically in FIG. 6. The features of FIG. 6 which are the same as those in FIG. 2 are identified with the same reference numerals. Unlike in the previous embodiment, there are no additional breakpoint value registers. As in FIG. 2, the type field consists of only three bits. The meanings of the possible values of the type field are as in FIG. 3.

In this embodiment, the global comparison selecting circuitry 26 has a selector 60 which is responsive to the value of a programmable comparison selecting value CSV2 stored in a comparison selection register CSELR2. For each part of the state characterising value SCV, the selector 60 selects bits from one of: the value stored in the CONTEXTIDR (i.e. the current CONTEXTID), the value stored in the DBGUIDR (the current DBGUID), the value stored in the VMIDR (the current VMID), or a masking value 0x00000000. The comparison selecting value CSV2 of this embodiment consists of a number of fields 64. Each field 64 is used to select from which register a corresponding part of the state characterising value SCV is taken, or whether the corresponding part should be taken from the masking value.

Figure 7:
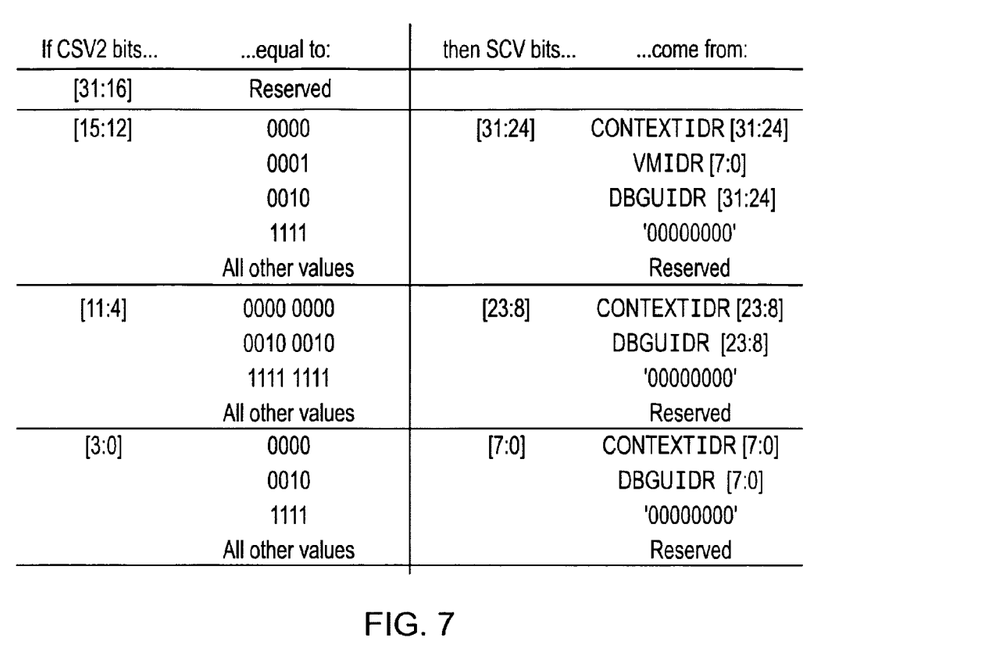
FIG. 7 shows a table which demonstrates how the comparison selecting value CSV2 is used in the second example embodiment.

FIG. 7 shows a table which demonstrates how the comparison selecting value CSV2 is used. Bits [31:16] of the comparison selecting value CSV2 are reserved. The selector 60 is not responsive to these bits. Bits [15:12] of the comparison selecting value CSV2 indicate from which register bits [31:24] of the state characterising value SCV are taken from. Bits [11:4] of the comparison selecting value CSV2 indicate from which register bits [23:8] of the state characterising value SCV are taken from. Bits [3:0] of the comparison selecting value CSV2 indicate from which register bits [7:0] of the state characterising value SCV are taken from.

Figure 8:
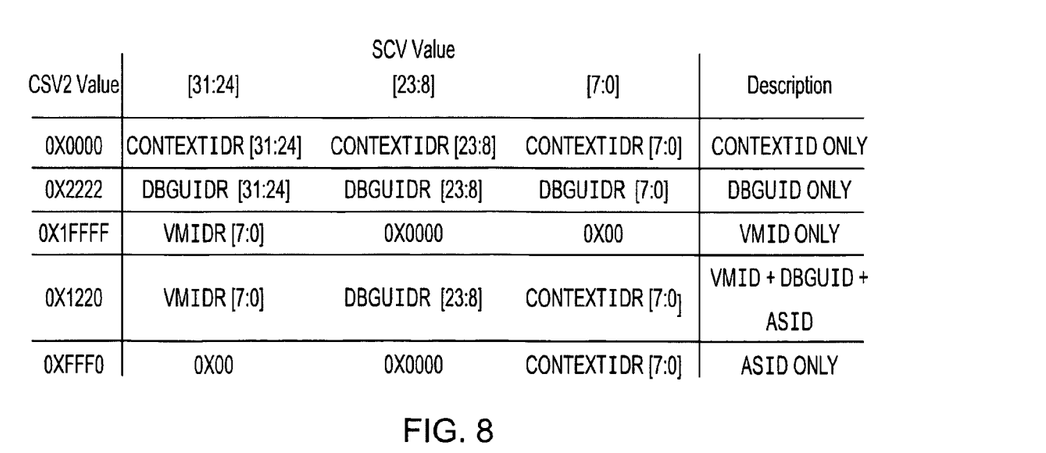
FIG. 8 shows some examples of combinations of identifiers which can be combined to form a state characterising value in the second example embodiment.

In this way, parts of different combinations of identifiers can be combined to form a state characterising value. FIG. 8 summarises some example combinations. If the comparison selecting value CSV2 is set to 0x0000, then the debug context value stored in the breakpoint value register BVR5 is compared with the CONTEXTID only. If the comparison selecting value CSV2 is set to 0x2222, the comparison is made with the DBGUIDR only. If the comparison selecting value CSV2 is set to 0x1FFF, the comparison is made with the VMID only. If the comparison selecting value CSV2 is set to 0x1220, a comparison is made with parts of the VMID, the DBGUID and the ASID (the ASID is formed of the least significant eight bits of the CONTEXTID). If the comparison selecting value CSV2 is set to 0xFFF0, the comparison is made with the ASID only. A comparison with the VMID only or the ASID only is possible because of the use of the masking value.

Using the present embodiment, the user can program the comparison selecting value CSV2 to select globally for all of the breakpoints which combination of identifiers is used to trigger diagnostic operations. This means the data processing system will require less circuit resource.

Although illustrative embodiments have been described in detail herein with reference to the accompanying drawings, it is to be understood that the claims are not limited to those precise embodiments, and that various changes and modifications can be effected therein by one skilled in the art without departing from the scope and spirit of the appended claims.

We claim:

1. An apparatus for processing data, comprising:
    processing circuitry configured to perform processing operations and access memory, said processing circuitry further configured to act as one of a plurality of virtual machines, each virtual machine identified by a virtual machine identifier, each virtual machine acting in one of a plurality of contexts, each context identified by a context identifier, each context executing a sequence of program instructions, each program instruction having one or more associated memory addresses;
    diagnostic circuitry coupled to said processing circuitry to perform diagnostic operations thereon; and
    diagnostic control circuitry, coupled to said processing circuitry and said diagnostic circuitry and configured to trigger said diagnostic circuitry to perform said diagnostic operations in response to current values of said virtual machine identifier, said context identifier, and at least one of said one or more associated memory addresses.

2. An apparatus as claimed in claim 1, wherein said diagnostic circuitry performs diagnostic operations including one or more of:
    triggering said processing circuitry to enter debug mode;
    turning a trace module on/off;
    outputting trace data to an internal trace device;
    outputting trace data to an external trace device; and
    triggering a software exception.

3. An apparatus as claimed in claim 1, wherein at least one of said one or more associated memory addresses is an address of a location in a memory where said program instruction is stored.

4. An apparatus as claimed in claim 1, wherein at least one of said one or more associated memory addresses is an address of a location in a memory accessed by said program instruction.

5. An apparatus as claimed in claim 1, wherein said diagnostic control circuitry has a plurality of programmable registers storing a trigger point defining value, and said diagnostic control circuitry triggers said diagnostic circuitry to perform said diagnostic operations in response to a comparison of said plurality of trigger point defining values with current values of said virtual machine identifier, said context identifier and said at least one of said one or more associated memory addresses.

6. An apparatus as claimed in claim 1, wherein said processing circuitry is configured to switch between one virtual machine and another virtual machine.

7. An apparatus as claimed in claim 1, wherein said diagnostic control circuitry is configured to trigger said diagnostic circuitry to perform said diagnostic operations in response to a selectable combination of said virtual machine identifier, said context identifier, and said at least one of said one or more associated memory addresses.

8. An apparatus for processing data, comprising:
processing means for performing processing operations and for accessing memory, said processing means being programmable to act as one of a plurality of virtual machines each identified by a virtual machine identifier, each virtual machine acting in one of a plurality of contexts each identified by a context identifier, each context executing a sequence of program instructions, each program instruction having one or more associated memory addresses;
diagnostic means, coupled to said processing means, for performing diagnostic operations thereon; and
diagnostic control means, coupled to said processing means and said diagnostic means, for controlling said diagnostic means, said diagnostic control means is responsive to current values of said virtual machine identifier, said context identifier, and at least one of said one or more associated memory addresses for triggering said diagnostic means to perform said diagnostic operations.

9. A method for processing data, comprising the steps of:
performing processing operations and accessing memory using processing circuitry programmable to act as one of a plurality of virtual machines each identified by a virtual machine identifier, each virtual machine acting in one of a plurality of contexts each identified by a context identifier, each context executing a sequence of program instructions, each program instruction having one or more associated memory addresses;
performing diagnostic operations using diagnostic circuitry coupled to said processing circuitry; and
triggering said diagnostic circuitry to perform said diagnostic operations in response to current values of said virtual machine identifier, said context identifier, and at least one of said one or more associated memory addresses.

10. A method for processing data as claimed in claim 9, wherein said diagnostic operations include one or more of:
triggering said processing circuitry to enter debug mode;
turning a trace module on/off;
outputting trace data to an internal trace device;
outputting trace data to an external device; and
triggering a software exception.

11. A method for processing data as claimed in claim 9, wherein one of said one or more associated memory addresses is an address of a location in a memory where said program instruction is stored.

12. A method for processing data as claimed in claim 9, wherein one of said one or more associated memory addresses is an address of a location in a memory accessed by said program instruction.

13. A method for processing data as claimed in claim 9, wherein said triggering step triggers said diagnostic circuitry to perform said diagnostic operations in response to a comparison of a plurality of trigger point defining values with current values of said virtual machine identifier, said context identifier and said at least one of said one or more associated memory addresses.

14. An apparatus for processing data, comprising:
processing circuitry configured to perform processing operations and access memory, said processing circuitry operating in one of a plurality of states each identified by at least one of a plurality of state identifiers;
diagnostic circuitry coupled to said processing circuitry to perform diagnostic operations thereon;
diagnostic control circuitry coupled to said processing circuitry and said diagnostic circuitry and having a plurality of programmable registers storing respective trigger point defining values, said diagnostic control circuitry being responsive to a comparison of each of a first subgroup of said plurality of trigger point defining values with a current value of a state characterising value formed of at least part of at least one of said plurality of state identifiers so as to trigger said diagnostic circuitry to perform said diagnostic operations; and
global comparison selecting circuitry responsive to a programmable comparison selecting value to select for all of said first subgroup of trigger point defining values which parts of said plurality of state identifiers form said state characterising value, wherein:
said diagnostic control circuitry also has a plurality of programmable control registers storing respective trigger point control values, each trigger point control value is associated with one of said trigger point defining values;
said processing circuitry is configured to execute a sequence of program instructions, each program instruction having one or more associated memory addresses;
said diagnostic control circuitry is responsive to a comparison of each of a second subgroup of said plurality of trigger point defining values with one of said one or more associated memory addresses so as to trigger said diagnostic circuitry to perform said diagnostic operations; and
said diagnostic control circuitry is responsive to each of said trigger point control values to select whether said trigger point defining value associated with said trigger point control value is a member of said first subgroup of trigger point defining values or said second subgroup of trigger point defining values.

15. An apparatus as claimed in claim 14, wherein said diagnostic circuitry performs diagnostic operations including one or more of:
triggering said processing circuitry to enter debug mode;
turning a trace module on/off;
outputting trace data to an internal trace device;
outputting trace data to an external trace device; and
triggering a software exception.

16. An apparatus as claimed in claim 14, wherein said processing circuitry is programmable to act as one of a plurality of virtual machines each identified by a virtual machine identifier, each virtual machine acting in one of a plurality of contexts each identified by at least one context identifier.

17. An apparatus as claimed in claim 16, wherein said plurality of state identifiers include said virtual machine identifier and said at least one context identifier, each state being identified by a combination of said virtual machine identifier and said at least one context identifier.

18. An apparatus as claimed in claim 16, wherein each of said plurality of contexts is identified by at least one of a first context identifier and a second context identifier.

19. An apparatus as claimed in claim 18, wherein said second context identifier is unique to each context.

20. An apparatus as claimed in claim 18, wherein said global comparison selecting circuitry selects said state characterising value to be formed from one of:
the whole of a current value of said first context identifier; or
the whole of a current value of said second context identifier.

21. An apparatus as claimed in claim 20, wherein said diagnostic control circuitry also has a second plurality of programmable registers storing respective virtual machine trigger point defining values, each virtual machine trigger point defining value being associated with one of said first subgroup of trigger point defining values and a respective one of said trigger point control values.

22. An apparatus as claimed in claim 21, wherein for each virtual machine trigger point defining value, said diagnostic control circuitry is selectively responsive to a comparison of said virtual machine trigger point defining value with a current value of said virtual machine identifier so as to trigger said diagnostic circuitry to perform said diagnostic operations.

23. An apparatus as claimed in claim 22, wherein for each virtual machine trigger point defining value, said diagnostic control circuitry is responsive to said trigger point control value associated with said virtual machine trigger point defining value so as to select whether or not said diagnostic control circuitry is responsive to said comparison of said virtual machine trigger point defining value with said current value of said virtual machine identifier.

24. An apparatus as claimed in claim 18, wherein said global comparison selecting circuitry selects said state characterising value to be formed from parts of at least one of a current value of said first context identifier, a current value of said second context identifier, a current value of said virtual machine identifier and a masking value.

25. An apparatus as claimed in claim 24, wherein said programmable comparison selecting value has a plurality of fields, and each field indicates from which one of said current value of said first context identifier, said current value of said second context identifier, said current value of said virtual machine identifier and said masking value a corresponding part of said state characterising value is selected.

26. An apparatus as claimed in claim 14, wherein said one of said one or more associated memory addresses is an address of a location in memory where said program instruction is stored.

27. An apparatus as claimed in claim 14, wherein said one of said one or more associated memory addresses is an address of a location in memory accessed by said program instruction.

28. An apparatus as claimed in claim 14, wherein at least one of said second subgroup of trigger point defining values defines a predetermined range of memory addresses, and said diagnostic control circuitry is responsive to whether or not said one of said one or more associated memory addresses is within said predetermined range of memory addresses so as to trigger said diagnostic circuitry to perform said diagnostic operations.

29. An apparatus as claimed in claim 28, wherein said at least one of said second subgroup of trigger point defining values includes a pair of address values indicating the upper and lower bounds of said predetermined address range.

30. An apparatus as claimed in claim 28, wherein said at least one of said second subgroup of trigger point defining values includes an address value and a mask, and said diagnostic control circuitry is responsive to the result of comparing said address value with a masked address value obtained by performing a bitwise mask operation on said one of said one or more associated memory addresses using said mask.

31. An apparatus as claimed in claim 14, wherein each of said second subgroup of trigger point defining values is selectively linked to one of said first subgroup of trigger point defining values, such that said diagnostic control circuitry is responsive to both said comparison of said first trigger point defining value with said state characterising value and said comparison of said second trigger point defining value with said one of said one or more associated memory addresses so as to trigger said diagnostic circuitry to perform said diagnostic operations.

32. An apparatus as claimed in claim 31, wherein more than one of said second subgroup of trigger point defining values are linked to one of said first subgroup of trigger point defining values.

33. An apparatus as claimed in claim 32, wherein said diagnostic control circuitry is responsive to each of said trigger point control values to select whether said trigger point defining value associated with said trigger point control value is linked to another of said trigger point defining values.

34. An apparatus as claimed in claim 31, wherein for each trigger point defining value of said second subgroup of trigger point defining values, said diagnostic control circuitry is responsive to said trigger point control value associated with said trigger point defining value of said second subgroup to select which of said first subgroup of trigger point defining values is linked to said trigger point defining value of said second subgroup.

35. An apparatus as claimed in claim 14, wherein said diagnostic control circuitry is responsive to each of said trigger point control values to select whether to trigger said diagnostic circuitry to perform said diagnostic operations when:
the result of a comparison is a match; or
the result of a comparison is a mismatch.

36. An apparatus as claimed in claim 35, wherein said result of said comparison is a mismatch in virtual machine identifier.

37. An apparatus for processing data, comprising:
processing means for performing processing operations and for accessing memory, said processing means operating in one of a plurality of states each identified by at least one of a plurality of state identifiers;
diagnostic means coupled to said processing means for performing diagnostic operations thereon;
diagnostic control means coupled to said processing means and said diagnostic means, for controlling said diagnostic means, said diagnostic control means having a plurality of programmable registers storing respective trigger point defining values, said diagnostic control means being responsive to a comparison of each of a first subgroup of said plurality of trigger point defining values with a current value of a state characterising value formed of at least part of at least one of said plurality of state identifiers so as to trigger said diagnostic means to perform said diagnostic operations; and
global comparison selecting means responsive to a programmable comparison selecting value for selecting for all of said first subgroup of trigger point defining values which parts of said plurality of state identifiers form said state characterising value, wherein:

said diagnostic control means also has a plurality of programmable control register means storing respective trigger point control values, each trigger point control value is associated with one of said trigger point defining values;

said processing means is configured to execute is configured to execute a sequence of program instructions, each program instruction having one or more associated memory addresses;

said diagnostic control means is responsive to a comparison of each of a second subgroup of said plurality of trigger point defining values with one of said one or more associated memory addresses so as to trigger said diagnostic means to perform said diagnostic operations; and said diagnostic control means is responsive to each of said trigger point control values to select whether said trigger point defining value associated with said trigger point control value is a member of said first subgroup of trigger point defining values or said second subgroup of trigger point defining values.

38. A method for processing data, comprising the steps of:

performing processing operations and accessing memory using processing circuitry operating in one of a plurality of states each identified by at least one of a plurality of state identifiers;

performing diagnostic operations on said processing circuitry using diagnostic circuitry coupled to said processing circuitry;

triggering said diagnostic circuitry to perform said diagnostic operations in response to a comparison of each of a first subgroup of a plurality of trigger point defining values with a current value of a state characterising value formed of at least part of at least one of said plurality of state identifiers; and selecting for all of said first subgroup of trigger point defining values which parts of said plurality of state identifiers form said state characterising value in response to a programmable comparison selecting value, wherein a plurality of programmable control registers are provided for storing respective trigger point control values, each trigger point control value being associated with one of said trigger point defining values, and said processing circuitry executes a sequence of program instructions, each program instruction having one or more associated memory addresses; and said method further comprises:

triggering said diagnostic circuitry to perform said diagnostic operations in response to a comparison of each of a second subgroup of said plurality of trigger point defining values with one of said one or more associated memory addresses; and selecting, in response to each of said trigger point control values, whether said trigger point defining value associated with said trigger point control value is a member of said first subgroup of trigger point defining values or said second subgroup of trigger point defining values.

* * * * *